United States Patent [19]

Brungart

[11] 4,116,291

[45] Sep. 26, 1978

[54] INTEGRATED STEERING CONTROL FOR TRACKED VEHICLES

[76] Inventor: Nelson D. Brungart, 3001 Old Hayneville Rd., Montgomery, Ala. 36108

[21] Appl. No.: 816,906

[22] Filed: Jul. 18, 1977

[51] Int. Cl.² .............................................. B62D 11/08
[52] U.S. Cl. ..................................... 180/6.2; 251/251; 251/324; 251/337
[58] Field of Search .......................... 180/6.2, 6.48, 6.7, 180/6.26; 137/595, 636.1; 251/324, 337, 251

[56] References Cited

U.S. PATENT DOCUMENTS

| 2,126,255 | 8/1938 | Hacker | 180/6.48 |
| 2,712,370 | 7/1955 | Westfall | 180/6.2 X |
| 3,266,588 | 8/1966 | Neumeyer | 180/6.2 |
| 3,363,412 | 1/1968 | Fischer | 251/324 |
| 3,988,893 | 11/1976 | Bojas | 60/445 |

Primary Examiner—Joseph F. Peters, Jr.
Assistant Examiner—R. Schrecengost
Attorney, Agent, or Firm—Clarence A. O'Brien; Harvey B. Jacobson

[57] ABSTRACT

A crawler tracked vehicle of the type including right and left crawler tracks is provided and includes a prime mover drivingly connected to the crawler tracks through a differential, or the equivalent, as well as separate clutch and brake mechanisms interposed in the drive train for the tracks intermediate the differential and the tracks. A single oscillatable control is provided as well as a set of fluid pressure actuators for the clutch and brake mechanisms. A source of fluid under pressure is also provided and a set of fluid flow conduits communicate the source of fluid pressure with each of the actuators, independently, with a set of valves being provided and operatively associated with the fluid flow conduits for selectively controlling the flow of fluid therethrough to the corresponding actuators. The single oscillatable control and the set of valves include coacting structure for opening and closing the valves in predetermined opening and closing sequence in response to oscillation of the oscillatable control. Still further, a second set of fluid flow conduits is provided for communicating the source of fluid pressure with each of the actuators, independently, and a second set of valves is included in the second set of fluid flow conduits for selectively controlling the flow of fluid therethrough to the corresponding actuators. The single oscillatable control also coacts with the second set of valves for opening and closing the second set of valves in a second predetermined sequence different from the first mentioned sequence, in response to oscillation of the oscillatable control, a control valve being provided for selectively communicating the source of fluid under pressure with the first and second mentioned sets of fluid conduits.

6 Claims, 4 Drawing Figures

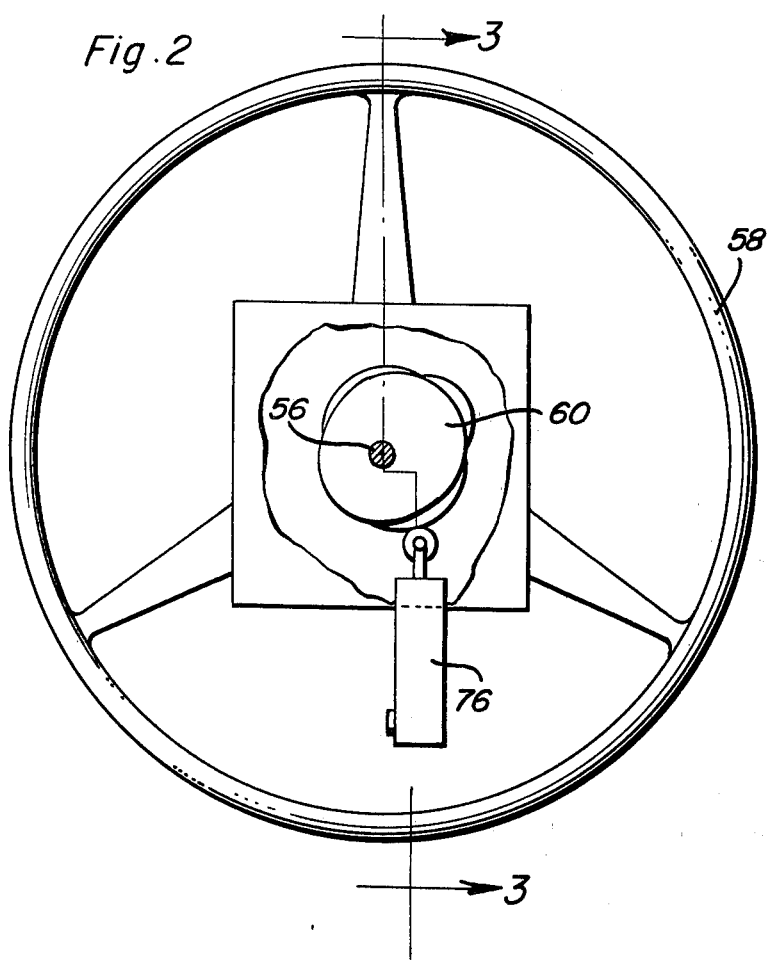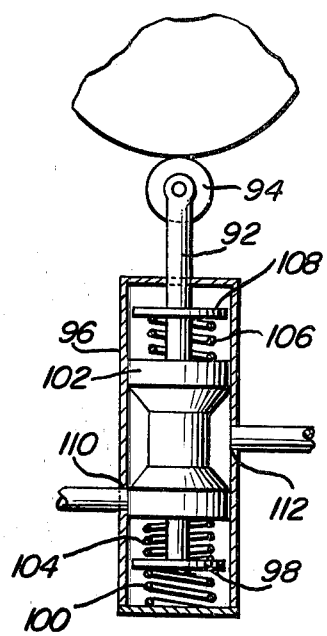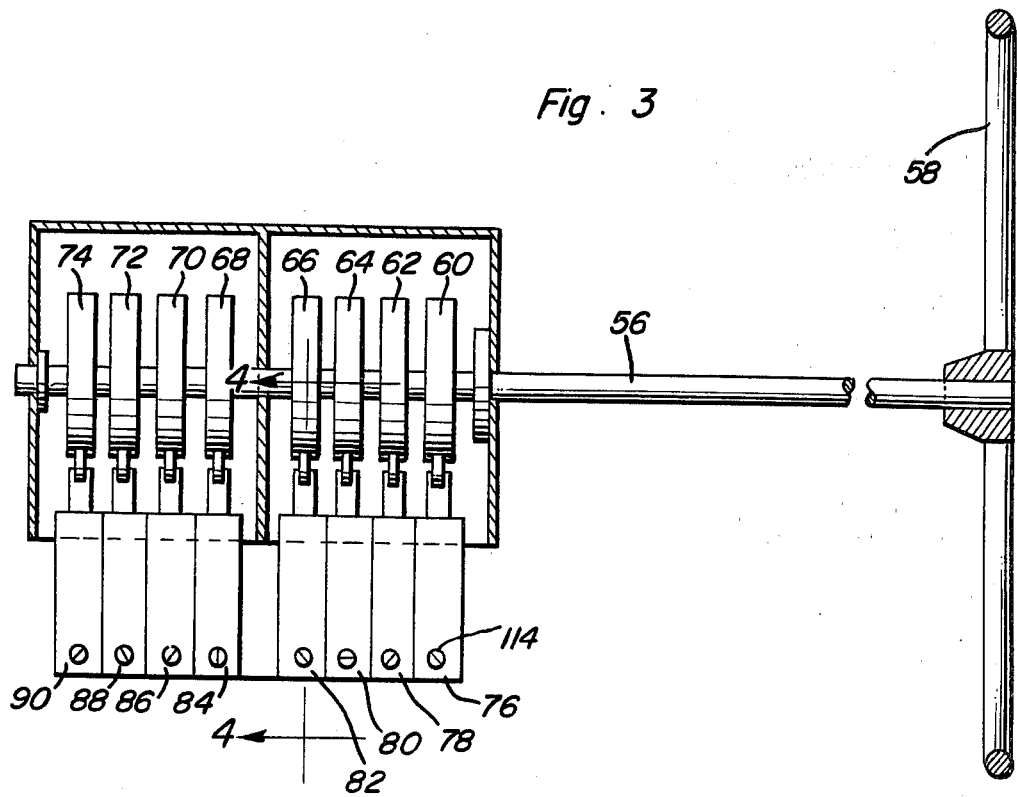

INTEGRATED STEERING CONTROL FOR TRACKED VEHICLES

BACKGROUND OF THE INVENTION

Crawler vehicles have been heretofore provided with various forms of steering controls. However, crawler vehicles have opposite side crawler tracks thereof each conventionally provided with independently operable clutch and brake mechanisms whereby the individual crawler tracks may be selectively clutched and/or braked. Thus, most forms of crawler vehicles include at least four steering controls which must be operated independently or in various combinations in unison to properly control the steering thereof.

Inasmuch as most crawler tracked vehicles include other equipment supported therefrom, such as a scrapper blade, or the like, which also include manually operable controls therefor, even though the operator of a crawler tracked vehicle may use both feet and both hands in steering the vehicle and controlling various auxiliary equipment carried thereby, full steering control and operation of the auxiliary equipment of the vehicle supported therefrom, in many cases, cannot be constantly effected by the operator. Further, the actuation of as many as four different controls, independently or in combinations thereof, merely to control steerage of the crawler tracked vehicle distracts from the ability of even an experienced operator to continuously monitor and actuate the controls of auxiliary equipment carried by the crawler tracked vehicle.

Accordingly, a need exists for a control for crawler tracked vehicle for steerage thereof and which will be readily operable to achieve all steering functions with minimum effort on the part of the operator of the vehicle. Specifically, a need exists for a single oscillatable control operable through the utilization of either both hands or only one hand of the operator of the vehicle to control all steering functions of the vehicle, thereby leaving both feet and at least one hand of the operator of the vehicle free to operate various controls of auxiliary equipment which may be carried by the vehicle.

Various forms of tracked vehicles and controls including some of the general structural and operational features of the instant invention are disclosed in U.S. Pat. Nos. 980,636, 1,425,753, 1,428,688, 2,704,131, 3,862,668, 3,894,719, 3,917,014 and 3,988,893.

BRIEF DESCRIPTION OF THE INVENTION

The integrated steering control of the instant invention utilizes a single oscillatable control for effectively actuating all of the various controls for steering a tracked vehicle including the clutch and brake controls for each of the right and left hand tracks of the vehicle.

The main object of this invention is to provide a control for the steerage of a tracked vehicle which will simplify the actions to be taken by the operator of the vehicle for steering the same.

Another object of this invention is to provide an oscillatable control, in accordance with the immediately preceding object, and which may be actuated by a single hand of the operator of the vehicle.

Yet another object of this invention is to provide a steering control system for a crawler tracked vehicle and which includes a single oscillatable actuator and which may be operated through a pair of sets of actuators for the clutch and brake mechanisms of the right and left hand tracks of the vehicle and with the two sets of actuators being operative to actuate the various clutch and brake mechanisms in different sequence in response to similar oscillation of the single oscillatable control for steering the vehicle.

A final object of this invention to be specifically enumerated herein is to provide an improved steering control for a crawler tracked vehicle which will conform to conventional forms of manufacture, be of simple construction and easy to use, so as to provide a device that will be economically feasible, long lasting and enable more efficient operation of a crawler tracked vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an elevational view of the single oscillatable steering control of the vehicle and with portions thereof being broken away to illustrate the manner in which the cams on the oscillatable control are operative to actuate various control valves in different sequence;

FIG. 3 is a fragmentary, sectional view taken substantially upon the plane indicated by the section line 3—3 of FIG. 2; and FIG. 4 is an enlarged, fragmentary, sectional view taken substantially upon the plane indicated by the section line 4—4 of FIG. 3.

DETAILED DESCRIPTION OF THE INVENTION

Figure 1:
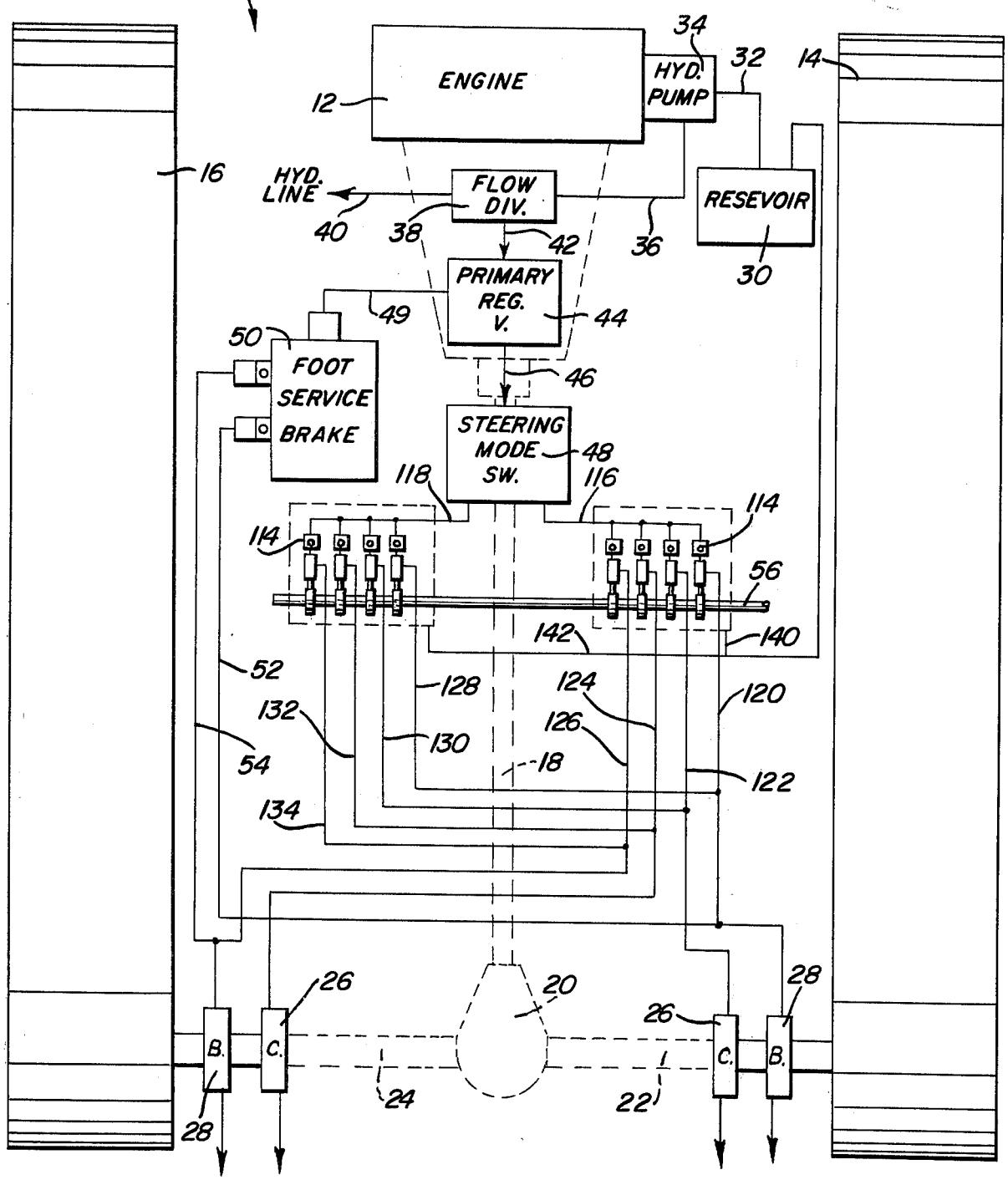
FIG. 1 is a plan schematic view of a crawler tracked vehicle with the steering control of the instant invention operatively associated with the prime mover of the vehicle and the clutch and brake mechanisms of the right and left hand tracks of the vehicle.

Referring now more specifically to the drawings, the numeral 10 generally designates a conventional form of tracked vehicle including a prime mover or engine 12 driving a pair of right and left hand track assemblies 14 and 16 through a drive shaft 18, or its equivalent, a differential 20 and a pair of right and left hand axle assemblies 22 and 24. The axle assemblies 22 and 24 each conventionally include a clutch actuator 26 and a brake actuator 28.

It is to be noted that various other forms of mechanisms for drivingly connecting the engine 12 to the track assemblies 14 and 16 may be utilized, but that the equivalent of the clutch and brake actuators 26 and 28 for each track assembly 14 and 16 will be retained.

The vehicle 10 includes a hydraulic fluid reservoir 30 and a supply line 32 extending from the reservoir 30 to a hydraulic pump 34 driven from the engine 12. The hydraulic pump 34 includes an outlet line 36 for supplying hydraulic fluid under pressure to a flow diverter 38 from which a line 40 extends for supplying fluid under pressure to various hydraulic mechanisms supported from the vehicle 10 independent of the hydraulic steering controls for the crawler tracks 14 and 16.

A line 42 also extends from the flow diverter to a primary regulator valve 44 whose function it is to reduce the hydraulic pressure supplied thereto and the regulator valve 44 includes a discharge line 46 extending to a steering mode switch 48 and also a discharge line 49 extending to a foot service brake valve assembly 50. The foot service brake valve assembly 50 includes a pair of lines 52 and 54 for supplying fluid under pressure therefrom to the brake actuators 28 carried by the axle assemblies 22 and 24.

Mounted on the vehicle 10 is an oscillatable shaft 56 including a steering wheel 58 on one end and two sets of cams 60, 62, 64, 66, and 68, 70, 72 and 74 mounted on the opposite end portion thereof. The cams have two sets of spool valves 76, 78, 80, 82, and 84, 86, 88 and 90 operatively associated therewith. The profile of each of the cams will be such to provide the desired timing of actuation and rate of actuation of the corresponding spool valves to become hereinafter more fully apparent. Each of the spool valves includes a reciprocal shaft 92 having a roller 94 journaled on one end thereof for rolling contact with the corresponding cam. The shaft 92 projects into a valve body 96 and includes a valve head 98 on the end thereof remote from the roller 94. A spring 100 is disposed within the body 96 and engages the head 98 to yieldingly bias the shaft 92 in a direction to maintain the roller 94 in rolling contact with the corresponding came. In addition, a spool 102 is mounted on the shaft for reciprocation relative thereto and centering springs 104 and 106 are disposed about the shaft 92 between the head 98 and the adjacent end of the spool 102 and between the opposite end of the spool 102 and a second head 108 carried on the shaft 92 intermediate the spool 102 and the roller 94. The body 96 includes a fluid inlet port 110 and a fluid outlet port 112.

In addition, each of the valves 76, 78, — 88 and 90 includes an adjustment screw restricter 114 operatively associated therewith for fine adjustment of the valves 76, 78 — 88 and 90. A suitable restrictor 114 is manufactured by Hy-Pneu Manufacturing Co. of St. Clair Shores, Mich., and indentified as Model FC 125.

The sets of valves are supplied fluid under pressure from the steering mode switch 48 through a pair of hydraulic lines 116 and 118 and lines 120, 122, 124 and 126 communicate the set of valves to which fluid under pressure is supplied through the line 116 to the right brake 28, right clutch 26, left clutch 26 and left brake 28, respectively. In addition, the second set of valves to which fluid under pressure is supplied through the line 118 include lines 128, 130, 132 and 134 communicated with the right brake 28, the right clutch 26, the left clutch 26 and the left brake 28, respectively.

Assuming that the steering mode switch is in a position to supply fluid under pressure to the line 116 and the valves 76, 78, 80 and 82, when the steering wheel 58 is in the neutral or center position, the right clutch will be engaged, the right brake will be disengaged, the left clutch will be engaged and the left brake will be disengaged. As the steering wheel 58 is turned approximately 30° to the right, the right clutch will progressively disengage and the right and left brakes will remain disengaged and the left clutch will remain engaged. When the steering wheel is turned further to the right from approximately 30° to approximately 60°, the right clutch will become fully disengaged, the right brake will progressively start engagement and the left clutch and left brake will remain engaged and disengaged, respectively. As the steering wheel is turned from approximately the 60° position to the 90° right hand position, the right clutch will remain disengaged, the right brake will be progressively fully engaged and the left clutch and left brake will remain engaged and disengaged, respectively. Of course, turning the steering wheel 58 from the center neutral position to the left will result in the same sequence of operation of the left clutch and brake while the right clutch and brake remain engaged and disengaged, respectively.

The tracked vehicle 10 has an inherent tendency to steer in the opposite direction when moving downwardly across a slope. This inherent tendency of opposite steering occurs because the track that has neither the clutch or brake engaged tends to outrun the track that has the clutch engaged and is using the engine for braking.

In order to offset this tendency, the steering mode switch 48 is actuated to communicate the line 118 with the source of fluid under pressure. Accordingly, when the steering wheel 58 is turned from the center or neutral position toward a 30° position to the right, the right clutch progressively and partially disengages and the right brake remains disengaged. When the steering wheel is turned from the approximate 30° right hand position to the approximate 60° right hand position, the right clutch progressively fully disengages and the right brake progressively partially engages. When the steering wheel 58 is turned further to the right from the 60° position to approximately the 90° position, the right clutch is disengaged and the right brake progressively becomes fully engaged. However, between the 30° and 60° right hand positions of the steering wheel 58, there is a period when both the right hand clutch and brake are partially engaged, such condition not occuring when the line 116 is communicated with the source of fluid under pressure. Of course, when the steering wheel 58 is turned to left, the operation of the left clutch and brake is effected in the same manner.

The foot service brake valve 50 includes a pair of independently operable valves (not shown) which may be actuated to override the steering controls of the vehicle 10 and apply the brakes 28. Further, the sets of valves include return lines 140 and 142 for returning hydraulic fluid from the valves to the reservoir 30.

Further, if the vehicle 10 is equipped with a reversing gear, a cam and corresponding valve is added for each reversing gear. Also, the functions of the varous steering valves could be electrically, as opposed to mechanically, effected, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a crawler tracked vehicle of the type including right and left crawler tracks, a prime mover drivingly connected to said crawler tracks through a differential and with separate right and left clutch and brake mechanisms interposed in the drive train for said tracks intermediate said differential and tracks, a single oscillatable control, a set of fluid pressure actuators for said clutch and brake mechanisms, a source of fluid under pressure, a first set of fluid flow means communicating said source of fluid pressure with each of said actuators, independently, and a set of valves operatively associated with said set of fluid flow means for selectively controlling the flow of fluid therethrough to the corresponding actuators, said single oscillatable control and said first set of valves including first coacting means for opening and closing said valves in first predetermined opening and closing sequence in response to oscillation of said oscillatable control, a second set of fluid flow means communicating said source of fluid pressure with each of said actuators, independently, a second set of valves operatively associated with said second set of fluid flow means for selectively controlling the flow of fluid therethrough to the corresponding actuators, said single oscillatable control and said second set of valves including second coacting means for opening and closing said second set of valve means in a second predetermined relative sequence, different from the first mentioned sequence, in response to oscillation of said oscillatable control, and control means for selectively communicating said source with said first and second sets of fluid flow means.

2. The combination of claim 1 wherein said valves each include adjustable fluid flow restricting means operatively associated therewith for variably restricting the flow of fluid through said valves when the latter are open.

3. The combination of claim 1 including a pair of additional control means operatively selectively communicating said source of fluid under pressure with said brake mechanism actuators.

4. The combination of claim 1 wherein said source of fluid under pressure comprises a fluid pump driven from said prime mover.

5. The combination of claim 1 wherein said oscillatable control includes an oscillatable journaled shaft, said coacting means including first and second sets of cams mounted on said shaft for oscillation therewith and shiftable operators for each set of said valves including followers engaged with the corresponding sets of cams.

6. The combination of claim 1 wherein the first coacting means include means for maintaining said brake actuators deactivated when said oscillatable control is disposed in a predetermined center position thereof and to progressively partially actuate the right clutch actuator, to partially declutch the right clutch, in response to initial shifting of said control in one direction from said center position, to fully actuate said right clutch actuator, and thus fully declutch the right clutch, and thereafter progressively actuate said right brake actuators upon further shifting of said control in said one direction and to thereafter maintain said right clutch actuator fully actuated and progressively fully actuate said right brake actuator upon still further movement of said actuator in said one direction, said coacting means being operative in the same manner with respect to said left clutch and left brake actuators in response to movement of said control in the other direction from said center position, said second coacting means including means for maintaining said clutch and brake actuators deactivated when said oscillatable control is disposed in said center position and to progressively partially actuate said right clutch actuator when said control is initially shifted in said one direction, to progressively fully actuate said right clutch actuator and progressively partially actuate said right brake actuator upon second further shifting of said control in said one direction and to fully actuate said right clutch actuator and progressively fully actuate said right brake actuator upon third still further shifting of said control in said one direction, said second coacting means being operative in the same manner with respect to said left clutch and left brake actuators in response to movement of said control in the other direction from said center position and said second coating means functioning differently from said first coacting means in that as a result of said second further shifting of said control in said one direction said clutch and brake actuators are partially actuated at the same time.

* * * * *